(12) United States Patent
Kobayakawa et al.

(10) Patent No.: US 10,616,588 B2
(45) Date of Patent: Apr. 7, 2020

(54) NON-TRANSITORY COMPUTER-READABLE STORAGE MEDIUM, ENCODING PROCESSING METHOD, AND ENCODING PROCESSING APPARATUS

(71) Applicant: FUJITSU LIMITED, Kawasaki-shi, Kanagawa (JP)

(72) Inventors: Takahiro Kobayakawa, Fukuoka (JP); Yasuo Misuda, Inagi (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/458,391

(22) Filed: Mar. 14, 2017

(65) Prior Publication Data

US 2017/0272761 A1  Sep. 21, 2017

(30) Foreign Application Priority Data

Mar. 18, 2016  (JP) ................................ 2016-055694

(51) Int. Cl.
*H04N 19/167* (2014.01)
*H04N 19/137* (2014.01)
(Continued)

(52) U.S. Cl.
CPC .............. *H04N 19/167* (2014.11); *G06T 7/11* (2017.01); *H04N 19/119* (2014.11);
(Continued)

(58) Field of Classification Search
CPC ...... H04N 19/176; H04N 19/61; H04N 5/145; H04N 19/167
See application file for complete search history.

(56) References Cited

U.S. PATENT DOCUMENTS 5,253,056 A   10/1993  Puri et al.
5,329,309 A *  7/1994  Dorricott ............. G11B 27/024
                                                        348/446
(Continued)

FOREIGN PATENT DOCUMENTS

JP    4-150284      5/1992
JP    5-328333     12/1993
(Continued)

OTHER PUBLICATIONS

NPL Internet Search log; 2019. (Year: 2019).*
(Continued)

*Primary Examiner* — Luis Perez-Fuentes
(74) *Attorney, Agent, or Firm* — Staas & Halsey LLP

(57) ABSTRACT

A non-transitory computer-readable storage medium storing an encoding processing program that causes a computer to execute a process, the process including acquiring image feature information of each of a plurality of image regions obtained by partitioning first image data and image feature information of each of the plurality of image regions obtained by partitioning second image data, determining, for each of the plurality of image regions, whether image feature information of the first image data and image feature information of the second image data have a correlation greater than or equal to a certain value, and coding a specified image region of the second image data which has the correlation, the coding being performed by using coding unit used for coding of an image region of the first image data whose position corresponds to the specified image region of the second image data.

5 Claims, 11 Drawing Sheets

(51) Int. Cl.
*H04N 19/176* (2014.01)
*H04N 19/119* (2014.01)
*H04N 19/527* (2014.01)
*H04N 19/54* (2014.01)
*H04N 19/543* (2014.01)
*G06T 7/11* (2017.01)

(52) U.S. Cl.
CPC ......... *H04N 19/137* (2014.11); *H04N 19/176* (2014.11); *H04N 19/527* (2014.11); *H04N 19/54* (2014.11); *H04N 19/543* (2014.11)

(56) References Cited

U.S. PATENT DOCUMENTS

| | | | |
|---|---|---|---|
| 5,357,287 A | 10/1994 | Koo et al. | |
| 5,473,378 A | 12/1995 | Tamitani | |
| 5,504,530 A | 4/1996 | Obikane et al. | |
| 5,510,840 A | 4/1996 | Yonemitsu et al. | |
| 5,754,243 A | 5/1998 | Kurihara et al. | |
| 5,841,475 A | 11/1998 | Kurihara et al. | |
| 6,008,852 A * | 12/1999 | Nakaya | H04N 19/105 348/699 |
| 6,069,918 A | 5/2000 | Meyer et al. | |
| 6,212,237 B1 | 4/2001 | Minami et al. | |
| 6,263,112 B1 | 7/2001 | Watanabe et al. | |
| 6,377,623 B1 | 4/2002 | Ra et al. | |
| 6,400,763 B1 | 6/2002 | Wee | |
| 6,950,465 B1 | 9/2005 | Yokoyama et al. | |
| 7,349,583 B2 * | 3/2008 | Kumar | H04N 19/61 345/648 |
| 7,599,436 B2 * | 10/2009 | Kobayakawa | H04N 5/145 375/240.16 |
| 7,692,688 B2 * | 4/2010 | Kurata | H04N 5/145 348/208.5 |
| 7,808,511 B2 * | 10/2010 | Opala | G06F 3/14 345/428 |
| 8,090,020 B2 * | 1/2012 | Kubota | H04N 19/176 375/240.12 |
| 8,203,648 B2 * | 6/2012 | Kobayakawa | H04N 19/159 348/413.1 |
| 8,351,511 B2 * | 1/2013 | Mitsuya | H04N 5/23248 375/240.12 |
| 8,818,046 B2 * | 8/2014 | Kurata | H04N 5/145 375/240 |
| 9,036,699 B2 * | 5/2015 | Vafin | H04N 19/176 375/240.03 |
| 9,143,806 B2 * | 9/2015 | Nilsson | H04N 19/176 |
| 9,215,467 B2 * | 12/2015 | Cheok | H04N 19/176 |
| 9,497,482 B2 * | 11/2016 | Chen | H04N 19/53 |
| 2002/0136299 A1 | 9/2002 | Matsumura et al. | |
| 2013/0148729 A1 | 6/2013 | Sasai et al. | |
| 2013/0223526 A1 | 8/2013 | Miyoshi et al. | |
| 2016/0057433 A1 | 2/2016 | Kudo et al. | |
| 2017/0026645 A1 * | 1/2017 | Zhou | H04N 19/124 |
| 2017/0337711 A1 * | 11/2017 | Ratner | H04N 19/176 |
| 2018/0332279 A1 * | 11/2018 | Kang | H04N 19/176 |

FOREIGN PATENT DOCUMENTS

| | | |
|---|---|---|
| JP | 6-225289 | 8/1994 |
| JP | 7-212764 | 8/1995 |
| JP | 7-231445 | 8/1995 |
| JP | 7-288817 | 10/1995 |
| JP | 9-37269 | 2/1997 |
| JP | 9-55940 | 2/1997 |
| JP | 9-163380 | 6/1997 |
| JP | 10-42298 | 2/1998 |
| JP | 10-174108 | 6/1998 |
| JP | 11-239354 | 8/1999 |
| JP | 11-252571 | 9/1999 |
| JP | 2002-218474 | 8/2002 |
| JP | 2004-72301 | 3/2004 |
| JP | 2014-204207 | 10/2014 |
| WO | 2012/042654 A1 | 4/2012 |
| WO | 2012/077332 A1 | 6/2012 |

OTHER PUBLICATIONS

Block partitioning structure in the HEVC standard; Kim; 2012 (Year: 2012).*
Overview of the High Efficiency Video Coding (HEVC) Standard; Sullivan; 2012 (Year: 2012).*
Fast global motion estimation using iterative least-square estimation technique; Murshed, 2003 (Year: 2003).*
Office Action for U.S. Appl. No. 11/907,701 dated Jun. 20, 2011.
Office Action for U.S. Appl. No. 11/907,701 dated Aug. 30, 2011.
Notice of Allowance for U.S. Appl. No. 11/907,701 dated Feb. 21, 2012.
Office Action for U.S. Appl. No. 10/957,730 dated Dec. 23, 2008.
Notice of Allowance for U.S. Appl. No. 10/957,730 dated Jun. 2, 2009.
Office Action dated Mar. 22, 2011 in Japanese Application 2006-322990.
Office Action dated Oct. 14, 2008 in Japanese Patent Application 2004-077792.
Office Action dated Oct. 23, 2019 in corresponding Japanese Patent Application No. 2016-055694.

* cited by examiner

FIG. 5
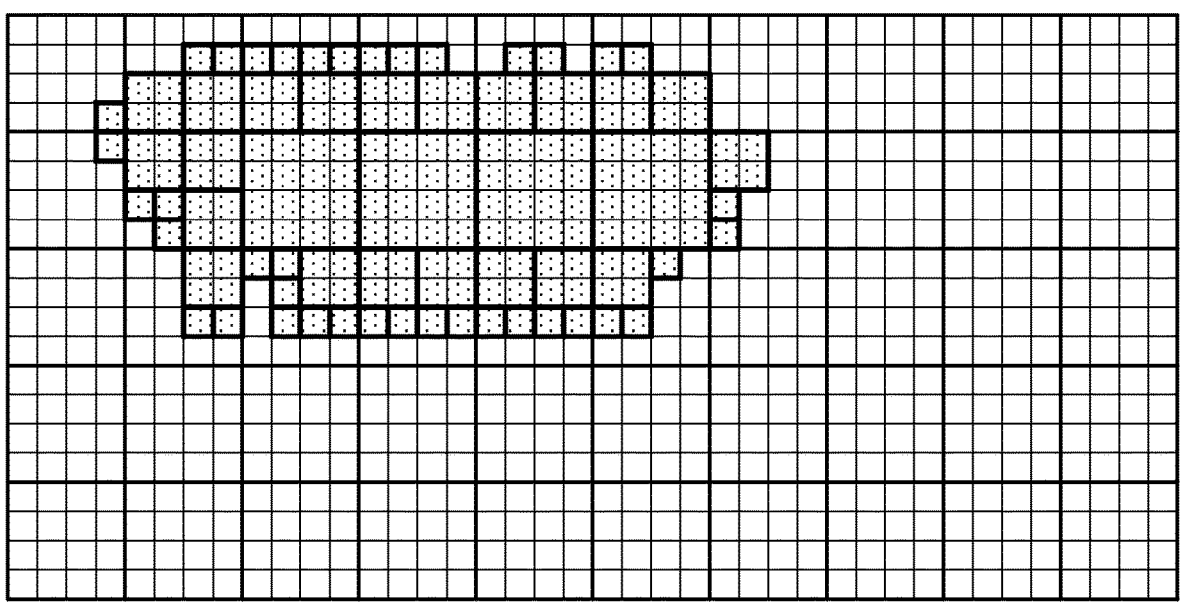
- CTB=64x64
- CASE OF MINIMUM CU SIZE = 16 × 16
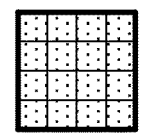 CU64-STATIC REGION
 CU32-STATIC REGION
 CU16-STATIC REGION

FIG. 6
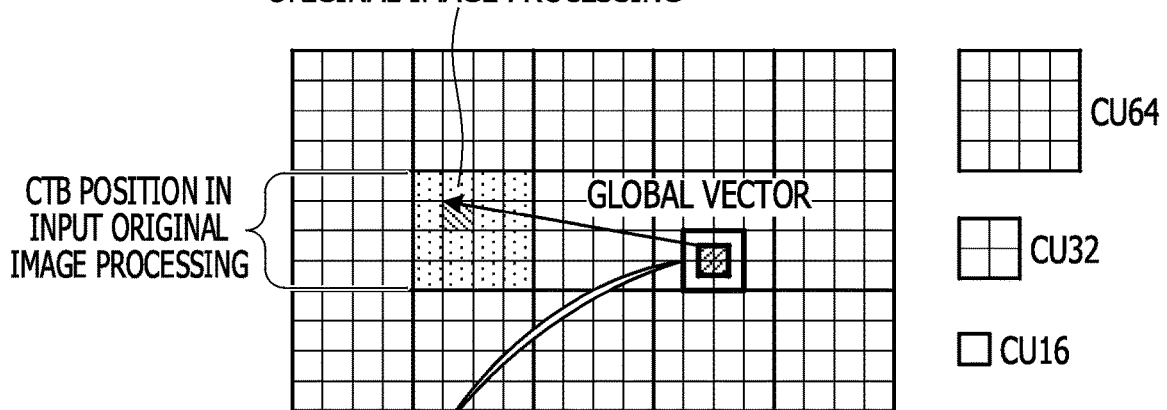
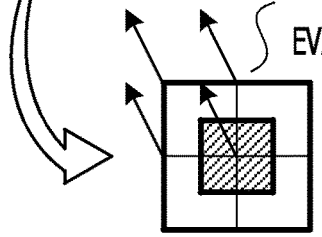

NON-TRANSITORY COMPUTER-READABLE STORAGE MEDIUM, ENCODING PROCESSING METHOD, AND ENCODING PROCESSING APPARATUS

CROSS-REFERENCE TO RELATED APPLICATION

This application is based upon and claims the benefit of priority of the prior Japanese Patent Application No. 2016-055694, filed on Mar. 18, 2016, the entire contents of which are incorporated herein by reference.

FIELD

The embodiments discussed herein are related to a non-transitory computer-readable storage medium, an encoding processing method, and an encoding processing apparatus.

BACKGROUND

As a coding method that enables compression coding at least twice as efficiently as H.264, there is high efficiency video coding (HEVC). HEVC is a basic technology for broadcasting, distributing, and accumulating next-generation 4K and 8K images. Furthermore, in transmitting, distributing, and accumulating images of quality less than or equal to full high-definition (HD) quality, HEVC enables increases in the quality of the images and in the number of channels.

In H.264, a macroblock (MB) that is a fixed image region of 16×16 pixels is a basic unit of encoding processing. Contrarily, in HEVC, a coding unit (CU) that has a hierarchical quad-tree structure and is variable between 8×8 pixels and 64×64 pixels, and a prediction unit (PU) or a transform unit (TU) are each a basic unit of encoding processing. Thus, in HEVC, a unit of encoding processing is adaptively and hierarchically determined, thereby increasing compression coding efficiency.

Related art is disclosed in Japanese Laid-open Patent Publication No. 2014-204207.

SUMMARY

According to an aspect of the invention, a non-transitory computer-readable storage medium storing an encoding processing program that causes a computer to execute a process, the process including acquiring image feature information of each of a plurality of image regions obtained by partitioning first image data and image feature information of each of the plurality of image regions obtained by partitioning second image data, determining, for each of the plurality of image regions, whether image feature information of the first image data and image feature information of the second image data have a correlation greater than or equal to a certain value, and coding a specified image region of the second image data which has the correlation, the coding being performed by using coding unit used for coding of an image region of the first image data whose position corresponds to the specified image region of the second image data.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 illustrates an example of a static region;

FIG. 6 illustrates an example of a PU partition condition;

DESCRIPTION OF EMBODIMENTS

In HEVC, however, there is a problem in that a large amount of operations are involved.

For example, to achieve both image quality and efficiency in HEVC, image quality and efficiency for sizes of all CUs obtainable and for a combination of PUs or TUs for each CU size are evaluated, and an optimal combination is extracted. At this time, the amount of operations involved in prediction processing, transform processing, and the like for evaluation is a maximum of four or more times larger than that in H.264. With such an increase in the amount of operations, the size of the circuit for compression coding and the power consumption of a processing apparatus increase.

One aspect is directed toward an encoding processing program, an encoding processing method, and an encoding processing apparatus that enable a reduction in the amount of operations.

An encoding processing program, an encoding processing method, and an encoding processing apparatus according to the present application will be described below with reference to the accompanying drawings. An embodiment does not limit a disclosed technique. Embodiments may be appropriately combined unless there are inconsistencies in processing details.

[Configuration of Encoding Processing Apparatus 10]

Figure 1:
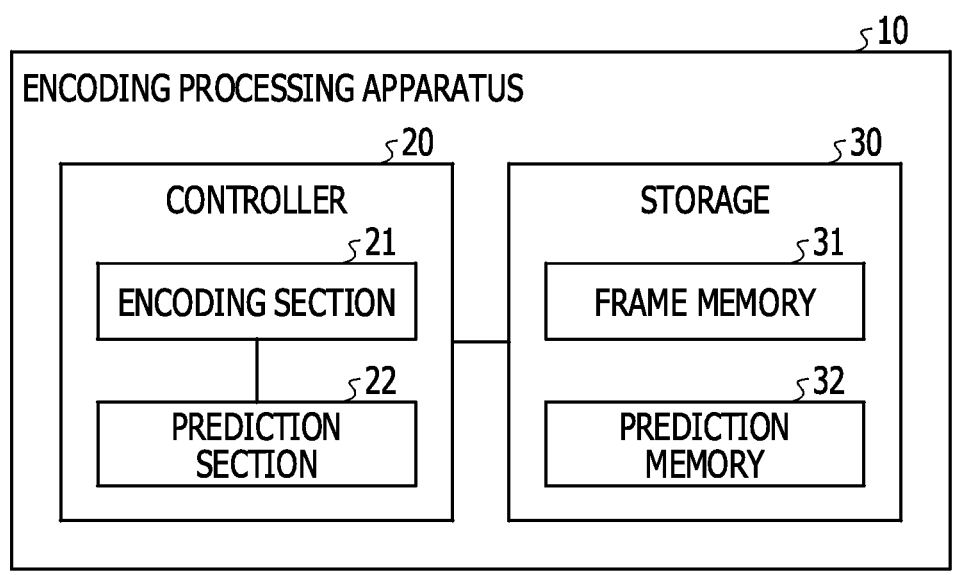
FIG. 1 is a block diagram illustrating a functional configuration of an encoding processing apparatus according to an embodiment.

FIG. 1 is a block diagram illustrating a functional configuration of an encoding processing apparatus according to an embodiment. An encoding processing apparatus 10 illustrated in FIG. 1 partitions an image into certain encoding processing units and executes encoding processing in which encoding is performed for each encoding processing unit.

In one embodiment, the encoding processing apparatus 10 may be implemented by installing onto an intended computer, as packaged software or software obtainable online, an encoding processing program that causes the above-described encoding processing to be executed. For example, an information processing apparatus may be caused to function as the encoding processing apparatus 10 by causing the information processing apparatus to run the above-described encoding processing program. Examples of the information processing apparatus described here include desktop or notebook personal computers. In addition, examples of the information processing apparatus include mobile communication terminals, such as smartphones, mobile phones, and personal handyphone system (PHS) phones, and also tablet devices, such as personal digital assistants (PDAs). When a terminal device used by a user serves as a client, the encoding processing apparatus 10 may also be implemented as a server device that provides a service regarding the above-described encoding processing to the client. For example, the encoding processing apparatus 10 is implemented as a server device that provides an encoding processing service in which a result obtained by executing the above-described encoding processing on an image received as an input is output. In this case, the encoding processing apparatus 10 may also be implemented as a web server, or may also be implemented as a cloud service that provides a service regarding the above-described encoding processing through outsourcing.

As illustrated in FIG. 1, the encoding processing apparatus 10 includes a controller 20 and storage 30. In FIG. 1, although solid lines representing data input and output relationships are illustrated, for convenience of explanation, only the minimum number of solid lines are illustrated. That is, data input and output for each processing section is not limited to the example of FIG. 1. Data input and output not illustrated in FIG. 1, for example, data input and output between processing sections, between a processing section and data, and between a processing section and an external device may be performed.

The storage 30 is a device that stores an operating system (OS) run by the controller 20, image processing software, and data for various programs, such as an application.

In one embodiment, the storage 30 is implemented as a main storage device in the encoding processing apparatus 10. For example, as the storage 30, any of various semiconductor memory devices, such as random access memory (RAM) or flash memory, may be employed. Furthermore, the storage 30 may be implemented as an auxiliary storage device. In this case, a hard disk drive (HDD), an optical disc, a solid state drive (SSD), or the like may be employed.

The storage 30 includes a frame memory 31 and a prediction memory 32 as examples of areas that store data used in a program run by the controller 20. Additionally, in the storage 30, other electronic data, such as definition data regarding highlighting, may also be stored. Descriptions of the above-described frame memory 31 and prediction memory 32 will be given together with a description of a processing section that registers or refers to each piece of data.

The controller 20 includes an internal memory storing various programs and control data and executes various processes by using these.

In one embodiment, the controller 20 is implemented as a central processing unit (CPU). The controller 20 does not have to be implemented as a CPU and may also be implemented as a micro processing unit (MPU) or a digital signal processor (DSP). Thus, the controller 20 is implemented as a processor, and it does not matter whether the type is a general-purpose type or a specialized type. Furthermore, the controller 20 may also be implemented by hardwired logic circuitry, such as an application specific integrated circuit (ASIC) or a field programmable gate array (FPGA).

When the controller 20 runs various programs, the following processing sections are implemented virtually. For example, as illustrated in FIG. 1, the controller 20 includes an encoding section 21 and a prediction section 22.

The encoding section 21 is a processing section that partitions an input original image into encoding processing units and that, for each partitioned encoding processing unit, reduces the amount of information by using a difference between the input original image and a prediction image, removes a high-frequency component through an orthogonal transformation, and performs entropy encoding processing and the like.

Figure 2:
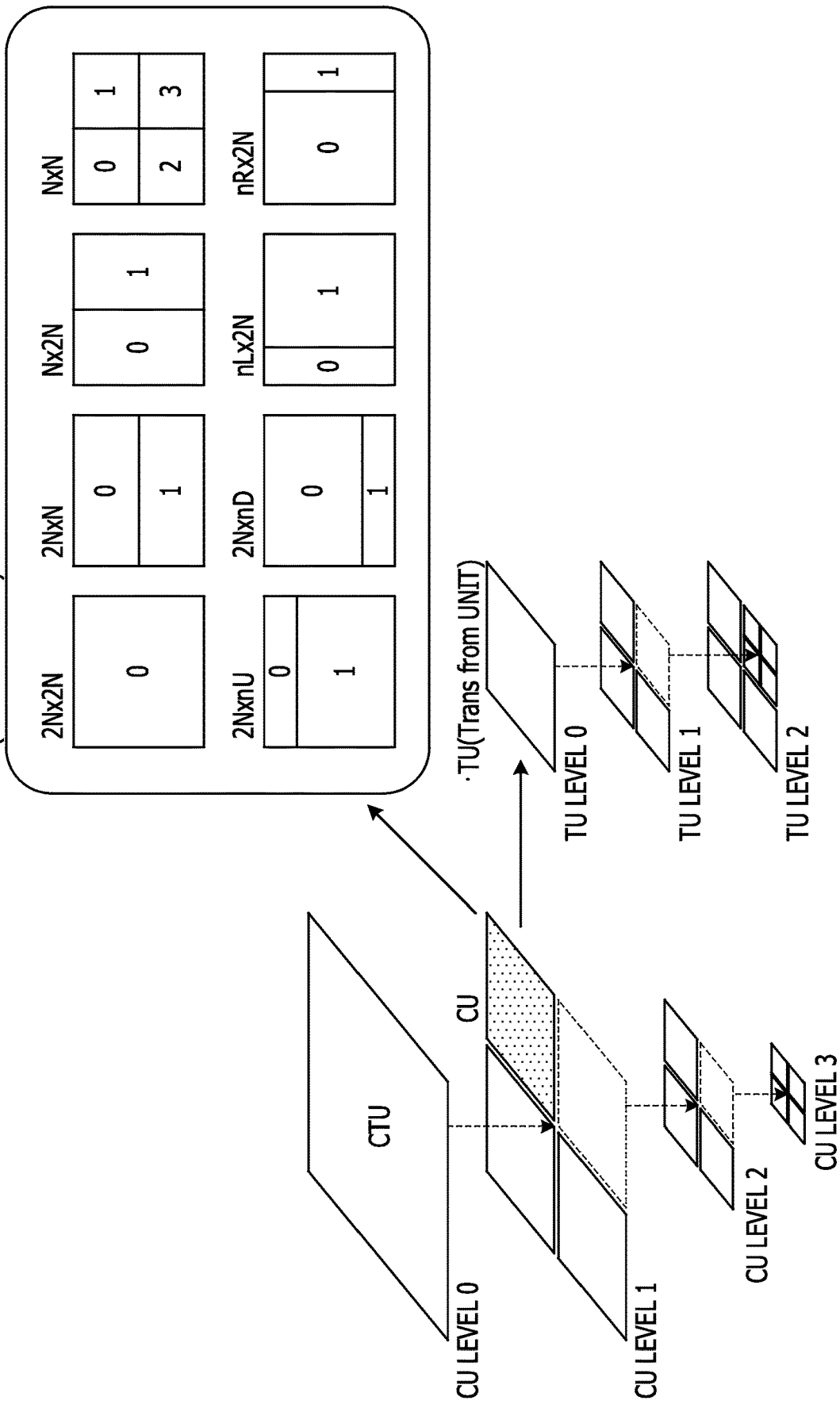
FIG. 2 illustrates an example of an encoding processing unit.

Here, an encoding processing unit is described. FIG. 2 illustrates an example of an encoding processing unit. In H.264, a macroblock (MB) that is a fixed image region of 16×16 pixels is a basic unit of encoding processing. Contrarily, as an encoding processing unit in HEVC, there are a coding unit (CU) that has a hierarchical quad-tree structure and is variable between 8×8 pixels and 64×64 pixels, and a prediction unit (PU) or a transform unit (TU) as illustrated in FIG. 2. A coding tree block (CTB) is a block of a maximum CU size, and a CU is determined by recursively partitioning the CTB in a quad-tree fashion. Thus, in HEVC, a unit of encoding processing is adaptively and hierarchically determined, thereby increasing compression coding efficiency. In descriptions of this embodiment, "size" refers to the number of pixels in horizontal and vertical directions in an image region. For example, a block of 8×8 pixels refers to a rectangular image region with 8 pixels in both the horizontal and vertical directions.

The encoding section 21 performs each process in units of CUs. A PU serves as an encoding processing unit in which intra-prediction, inter-prediction, and the like are performed and which is obtained by further partitioning a CU. As illustrated in FIG. 2, the PU includes patterns of 2N×2N, 2N×N, N×2N, N×N, 2N×nU, 2N×nD, nL×2N, nR×2N, and the like. A TU is an encoding processing unit which is obtained by further partitioning a CU in a quad-tree fashion and in which transform processing, quantization processing, and the like are performed.

Figure 3:
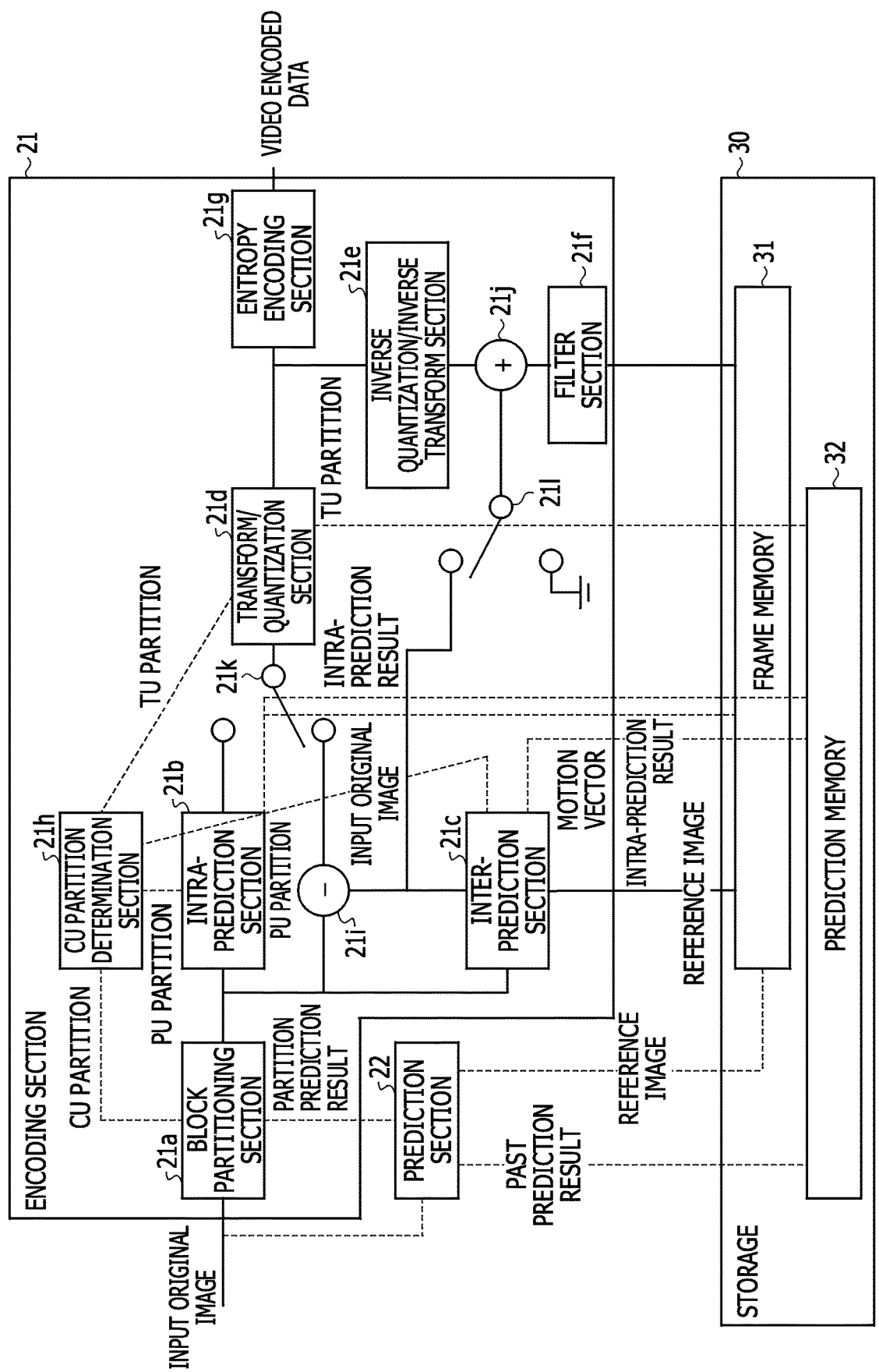
FIG. 3 is a block diagram illustrating a functional configuration of an encoding section of the encoding processing apparatus according to this embodiment.

FIG. 3 is a block diagram illustrating a functional configuration of the encoding section of the encoding processing apparatus according to this embodiment. In FIG. 3, although solid lines and dashed lines representing data input and output relationships are illustrated, for convenience of explanation, only the minimum number of solid lines and dashed lines are illustrated. That is, data input and output for each processing section is not limited to the example of FIG. 3. Data input and output not illustrated in FIG. 3, for example, data input and output between processing sections, between a processing section and data, and between a processing section and an external device may be performed.

For example, as illustrated in FIG. 3, the encoding section 21 includes a block partitioning section 21a, an intra-prediction section 21b, an inter-prediction section 21c, a transform/quantization section 21d, an inverse quantization/inverse transform section 21e, a filter section 21f, an entropy encoding section 21g, and a CU partition determination section 21h.

The block partitioning section 21a is a processing section that partitions an input original image into certain encoding processing units.

The intra-prediction section 21b is a processing section that performs intra-prediction in which a pixel in a PU of an input original image is predicted from a pixel in another PU of the input original image. An intra-prediction result obtained in the intra-prediction section 21b is stored in the prediction memory 32. In some cases, intra-prediction is also referred to as intra-frame prediction.

The inter-prediction section 21c is a processing section that performs inter-prediction in which a pixel in a PU of an input original image is predicted by motion compensation between the input original image and a reference image. A motion vector and an inter-prediction result obtained in the inter-prediction section 21c are stored in the prediction memory 32. In some cases, inter-prediction is also referred to as inter-frame prediction.

A subtraction section 21i subtracts an inter-prediction result from an input original image to thereby generate and output a prediction error image.

The transform/quantization section 21d is a processing section that performs an orthogonal transformation of a prediction error image or an intra-prediction result for each TU and quantizes transformed data. Here, a resultant TU partition is stored in the prediction memory 32. Control is performed by switching a switch 21k as to whether the transform/quantization section 21d acquires a prediction error image or an intra-prediction result.

The inverse quantization/inverse transform section 21e is a processing section that inversely quantizes data quantized by the transform/quantization section 21d and transforms the inversely quantized data into data of a prediction error image through an inverse orthogonal transformation.

An addition section 21j outputs a result obtained by adding an inter-prediction result to a prediction error image to the filter section 21f. The addition section 21j may acquire an inter-prediction result by switching a switch 21l.

The filter section 21f is a processing section that applies a deblocking filter to boundary pixels between a PU and a TU to smooth unevenness between the PU and the TU.

The entropy encoding section 21g is a processing section that encodes data quantized in units of TUs through entropy encoding in which a variable-length codeword is assigned in accordance with the frequency of occurrence of each symbol and that outputs the data as video encoded data.

The CU partition determination section 21h is a processing section that acquires a CU partition from the block partitioning section 21a, PU partitions from the intra-prediction section 21b and the inter-prediction section 21c, and a TU partition from the transform/quantization section 21d, and that selects an optimal combination of a CU, a TU, and a PU.

In one embodiment, the CU partition determination section 21h evaluates, for each combination of a CU, a TU, and a PU, motion vector detection and a frequency response obtained through an orthogonal transformation to select a combination of a CU, a TU, and a PU having the best coding efficiency. Subsequently, each processing section of the encoding section 21 performs encoding processing based on a CU, a PU, and a TU selected by the CU partition determination section 21h.

The configuration of the encoding section 21 and the processes performed by the processing sections are not limited to those described above. The encoding section 21 may have any configuration that enables encoding processing using HEVC to be executed by applying certain CU, PU, and TU, for example.

Figure 4:
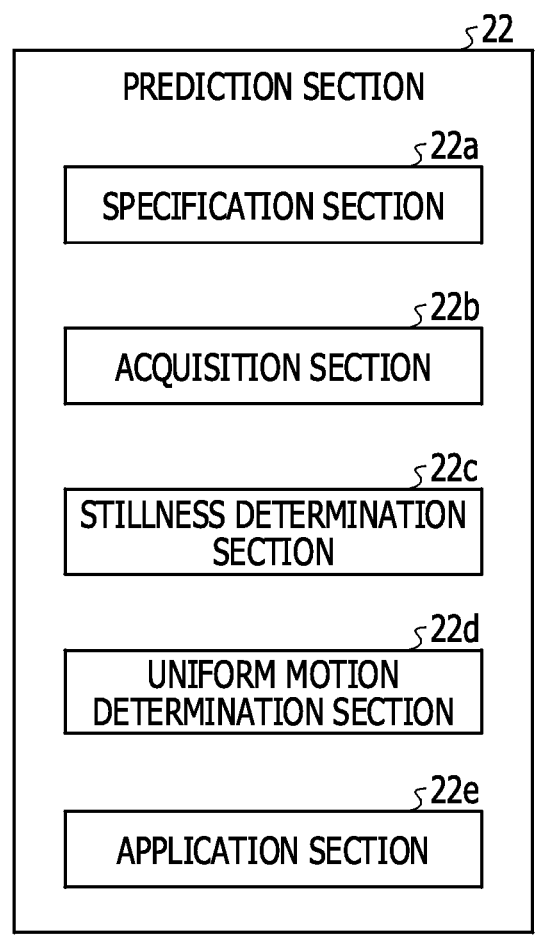
FIG. 4 is a block diagram illustrating a functional configuration of a prediction section of the encoding processing apparatus according to this embodiment.

FIG. 4 is a block diagram illustrating a functional configuration of the prediction section of the encoding processing apparatus according to this embodiment. As illustrated in FIG. 4, the prediction section 22 includes, for example, a specification section 22a, an acquisition section 22b, a stillness determination section 22c, a uniform motion determination section 22d, and an application section 22e.

The prediction section 22 is a processing section that predicts an optimal encoding processing unit to be used in encoding processing performed in the encoding section 21 and applies it as an encoding processing unit used in the encoding section 21.

The prediction section 22 determines, by using the stillness determination section 22c or the uniform motion determination section 22d, whether there is a correlation greater than or equal to a certain value between an image region in a reference image that is first image data and an image region in an input original image that is second image data in terms of image feature information. With respect to, among a plurality of image regions contained in a reference image and a plurality of image regions contained in an input original image, image regions whose respective positions in image data correspond to each other, the prediction section 22 determines, based on a comparison result of acquired image feature information, whether there is a correlation greater than or equal to the certain value between the image region in the reference image and the image region in the input original image in terms of the image feature information. The application section 22e applies an encoding processing unit applied to the image region in the reference image having been determined to have a correlation greater than or equal to the certain value in terms of the image feature information to the image region in the input original image having been determined to have a correlation greater than or equal to the certain value.

In one embodiment, the prediction section 22 determines whether image feature information of a certain image region in an input original image satisfies a certain condition. When the certain condition is satisfied, the prediction section 22 acquires some or all of a CU, a TU, and a PU, which are encoding processing units, in a reference image from a past prediction result stored in the prediction memory 32 and notifies the block partitioning section 21a of these encoding processing units as a partition prediction result. The encoding section 21 performs encoding processing by using the provided encoding processing units without evaluations and selections of encoding processing units being made by the CU partition determination section 21h. A reference image refers to an image frame that is different from an already encoded input original image and stored in the frame memory 31.

The specification section 22a is a processing section that partitions image data into a plurality of image regions of a certain size and specifies each partitioned image region as an evaluation block that is an image region for which an encoding processing unit of an input original image is predicted.

In one embodiment, the specification section 22a specifies a minimum CU size that is one of the coding parameters in HEVC as the size of an evaluation block. For example, when the CU size ranges from 16×16 pixels to 64×64 pixels, 16×16 pixels are specified as the size of an evaluation block.

The acquisition section 22b is a processing section that acquires image feature information of an evaluation block in an input original image and image feature information of an evaluation block in a reference image corresponding to the evaluation block in the input original image. For each of the reference image and the input original image, the acquisition section 22b acquires image feature information of each of a plurality of evaluation blocks of a certain size obtained by partitioning image data.

In one embodiment, the acquisition section 22b calculates, as image feature information, a SAD that is a sum of absolute differences between pixels in units of evaluation blocks by using expression (1). In expression (1), $P_{org}$ denotes a pixel in an input original image, $P_{ref}$ denotes a pixel in a reference image, N denotes the number of pixels in an evaluation block, and i denotes a pixel position.

$$SAD = \sum_{i=0}^{i=N-1} |P_{org_i} - P_{ref_i}| \quad (1)$$

The acquisition section 22b may also acquire, as image feature information, an SATD that is a sum of absolute transformed differences based on orthogonally transformed values by using expression (2).

$$C = H[P_{org} - P_{ref}] \quad (2)$$

$$SATD = \sum_{i=0}^{i=N-1} |C_i|$$

$n$-th order Hadamard matrix $Hn = \begin{pmatrix} H_{n-1} & H_{n-1} \\ H_{n-1} & -H_{n-1} \end{pmatrix}$ first order Hadamard matrix $H_1 = [1]$ The stillness determination section 22c is a processing section that determines, based on a comparison result of an evaluation block in an input original image with an evaluation block in a reference image, that the evaluation block in the input original image having been determined to have a correlation greater than or equal to a certain value with the evaluation block in the reference image in terms of image feature information is a static region.

In one embodiment, the stillness determination section 22c determines whether a SAD or SATD between an evaluation block in an input original image and an evaluation block located at a corresponding position in a reference image is less than or equal to a certain threshold value. Then, when a SAD or SATD is less than or equal to the certain threshold value, the stillness determination section 22c determines that the evaluation block in the input original image has a correlation greater than or equal to the certain value with the corresponding evaluation block in the reference image and is thus a static region. Here, a threshold value may be given as an adjustable parameter.

FIG. 5 illustrates an example of a static region. As illustrated in FIG. 5, first, the stillness determination section 22c makes a determination of a static region for each 16×16-pixel block of a minimum CU size in a CTB. Subsequently, the stillness determination section 22c evaluates the numbers and shapes of sets of evaluation blocks having been determined to be a static region in a region of 32×32 pixels and also in a region of 64×64 pixels that is the CTB. Then, when the number and shape of sets of evaluation blocks having been determined to be a static region satisfy certain conditions, the stillness determination section 22c may consider all of blocks of 32×32 pixels or 64×64 pixels as a static region.

The uniform motion determination section 22d is a processing section that determines, based on a comparison result of feature information, that, among evaluation blocks in an input original image, an evaluation block having a correlation greater than or equal to a certain value with an evaluation block in a reference image that is a source identified based on a global vector is a uniform moving region.

The uniform motion determination section 22d acquires a global vector between a reference image and an input original image and identifies, based on the global vector, a source evaluation block that is a source of an evaluation block having been determined to not be a static region in the input original image. Then, the uniform motion determination section 22d determines, based on a comparison result of the evaluation block in the input original image with the source evaluation block, that the evaluation block in the input original image having been determined to have a correlation greater than or equal to the certain value with the source evaluation block in terms of image feature information is a uniform moving region. The application section 22e applies to the uniform moving region a PU among encoding processing units applied to the evaluation block in the reference image having been determined to have a correlation greater than or equal to the certain value in terms of the image feature information.

In one embodiment, first, the uniform motion determination section 22d acquires a global vector between an input original image and a reference image. A global vector refers to a vector representing a large amount of motion of an entire image or a certain region unit. Then, the uniform motion determination section 22d identifies, based on the global vector, an evaluation block that is a source of an evaluation block in the input original image from the reference image.

Then, when a SAD or SATD between the evaluation block in the input original image and the source evaluation block is less than or equal to a certain threshold value, the uniform motion determination section 22d determines that the evaluation block in the input original image has a correlation greater than or equal to the certain value with the source evaluation block in the reference image and is thus a uniform moving region. Here, a threshold value may be given as an adjustable parameter that is different from the threshold value used in the stillness determination section 22c. An evaluation block having been determined to be a static region by the stillness determination section 22c is excluded from evaluation blocks to be subjected to a determination process of a uniform moving region.

Furthermore, when not only a SAD or SATD condition but also a PU partition condition is satisfied, the uniform motion determination section 22d may determine that an evaluation block is a uniform moving region. FIG. 6 illustrates an example of a PU partition condition. As illustrated in FIG. 6, for example, a source evaluation block in a reference image corresponding to an evaluation block of 16×16 pixels in an input original image overlaps a plurality of CUs in some cases. In such a case, it is made a PU partition condition that there is no boundary of a different PU in the source evaluation block and that all motion vectors of the plurality of CUs acquired from a past prediction result stored in the prediction memory 32 are equal. Furthermore, in the case where, among CUs around a global vector, there is a CU whose feature is close to that of the evaluation block in the input original image, when a SAD value or an SATD value between the evaluation block and the CU is less than or equal to a threshold value, the uniform motion determination section 22d may determine that the evaluation block is a uniform moving region.

Like the stillness determination section 22c, first, the uniform motion determination section 22d makes a determination of a uniform moving region for each 16×16-pixel block of a minimum CU size in a CTB. Subsequently, the uniform motion determination section 22d evaluates the numbers and shapes of sets of evaluation blocks having been determined to be a uniform moving region in a region of 32×32 pixels and also in a region of 64×64 pixels that is the CTB. Then, when the number and shape of sets of evaluation blocks having been determined to be a uniform moving region satisfy certain conditions, the uniform motion determination section 22d may consider all of blocks of 32×32 pixels or 64×64 pixels as a uniform moving region.

The application section 22e is a processing section that applies encoding processing units of a reference image to a static region and a uniform moving region in an input original image.

In one embodiment, to a CTB including a certain proportion or more of static regions, the application section 22e applies a CU, a PU, and a TU of a CTB located at a corresponding position in a reference image. To a CTB not including the certain proportion or more of static regions and including a uniform moving region, a PU of a CTB including a source evaluation block in a reference image is applied.

Assume that a CTB not including the certain proportion or more of static regions and any uniform moving region is a scene change region. In a scene change region, an encoding processing unit is re-determined. That is, to a scene change region, a CU, a PU, and a TU selected by the CU partition determination section 21h are applied.

Furthermore, encoding may be performed by applying a fixed value preset as an encoding processing unit to an evaluation block having been determined to be neither a static region nor a uniform moving region in an input original image. For example, when a CU size of a scene change region is set to a fixed value or a value programmably determined through statistical processing of an input original image, the amount of processing is reduced.

Figure 7:
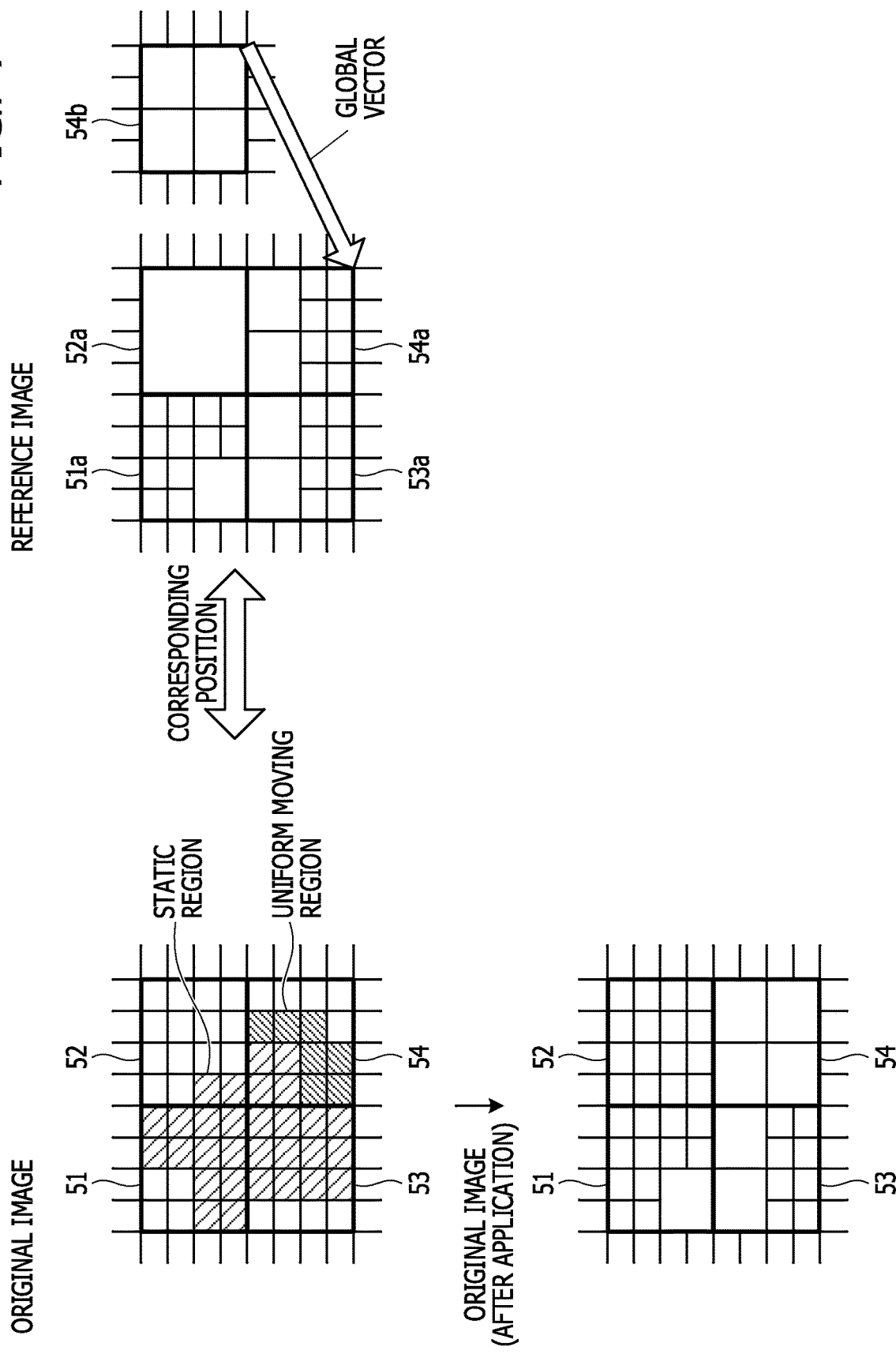
FIG. 7 illustrates an example of inheritance of encoding processing units.

FIG. 7 illustrates an example of inheritance of encoding processing units. As an example, assume that a minimum CU size is 16×16 pixels. Furthermore, as an example, assume that, when the proportion of static regions is not less than 10/16, the application section 22e determines that there is a certain proportion or more of static regions. As illustrated in FIG. 7, a CTB 51 includes 12 static regions out of 16, which refers to the fact that there is the certain proportion or more of static regions. Thus, the application section 22e applies a CU, a PU, and a TU of a CTB 51a in a reference image to the CTB 51. A CTB 52 includes 2 static regions out of 16, which refers to the fact that there is not the certain proportion or more of static regions, and does not include any uniform moving region. Thus, the CTB 52 is processed as a scene change region. In the example of FIG. 7, assume that a CU of the scene change region is a fixed region of 16×16 pixels. A CTB 53 includes 12 static regions out of 16, which refers to the fact that there is the certain proportion or more of static regions. Thus, the application section 22e applies a CU, a PU, and a TU of a CTB 53a in the reference image to the CTB 53. A CTB 54 includes 4 static regions out of 16, which refers to the fact that there is not the certain proportion or more of static regions, and includes uniform moving regions. Thus, the application section 22e applies a PU of a CTB 54b in the reference image that is a source of the CTB 54 to the CTB 54.

[Flows of Processes]

Next, the flows of processes performed by the encoding processing apparatus 10 according to this embodiment will be described. Here, descriptions will be given in the order of (1) flow of overall processing, (2) static region determination process, and (3) uniform moving region determination process that are performed by the encoding processing apparatus 10.

(1) Flow of Overall Processing

Figure 8:
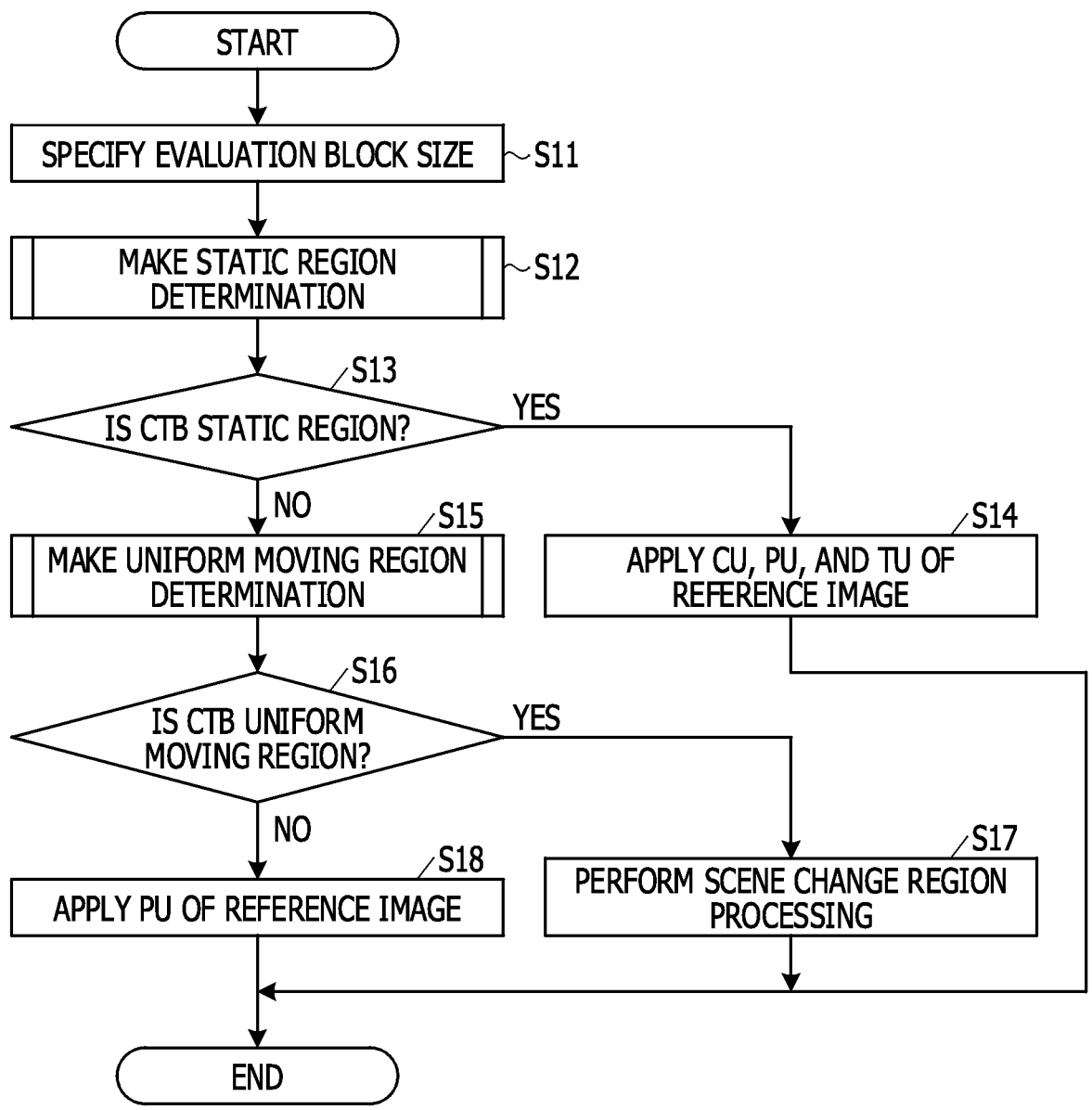
FIG. 8 is a flowchart illustrating a procedure of encoding processing according to this embodiment.

FIG. 8 is a flowchart illustrating a procedure of encoding processing according to this embodiment. This processing may be automatically started or may be started based on a manual setting. Steps S12 to S18 among processes illustrated in FIG. 8 are processes performed for each single input original image and are performed repeatedly every time an input original image is input.

As illustrated in FIG. 8, the specification section 22a specifies an evaluation block size (step S11). At this time, the specification section 22a specifies a minimum CU size that is one of the coding parameters in HEVC as an evaluation block size, for example.

Then, the stillness determination section 22c makes a static region determination (step S12). In the static region determination, the acquisition section 22b acquires image feature information of an evaluation block in an input original image and image feature information of an evaluation block in a reference image located at a position corresponding to that of the evaluation block in the input original image.

To a CTB having been determined to be a static region in the input original image (Yes in step S13), the application section 22e applies a CU, a PU, and a TU of the reference image (step S14). Here, in step S13, for example, a CTB including a certain proportion or more of evaluation blocks having been determined to be a static region in the static region determination is determined to be a static region.

For a CTB having been determined to not be a static region (No in step S13), the uniform motion determination section 22d makes a uniform moving region determination (step S15). To the CTB having been determined to be a uniform moving region in the input original image as a result of the uniform moving region determination (Yes in step S16), the application section 22e applies a PU of the reference image (step S17). In the uniform moving region determination, the acquisition section 22b acquires image feature information of an evaluation block in the input original image and image feature information of an evaluation block in the reference image that is a source of the evaluation block in the input original image.

On the CTB having been determined to not be a uniform moving region in the input original image as a result of the uniform moving region determination (No in step S16), scene change region processing is performed (step S18). In the scene change region processing, an encoding processing unit is re-determined, or encoding processing using a CU size set to a fixed value is performed.

(2) Static Region Determination Process

Figure 9:
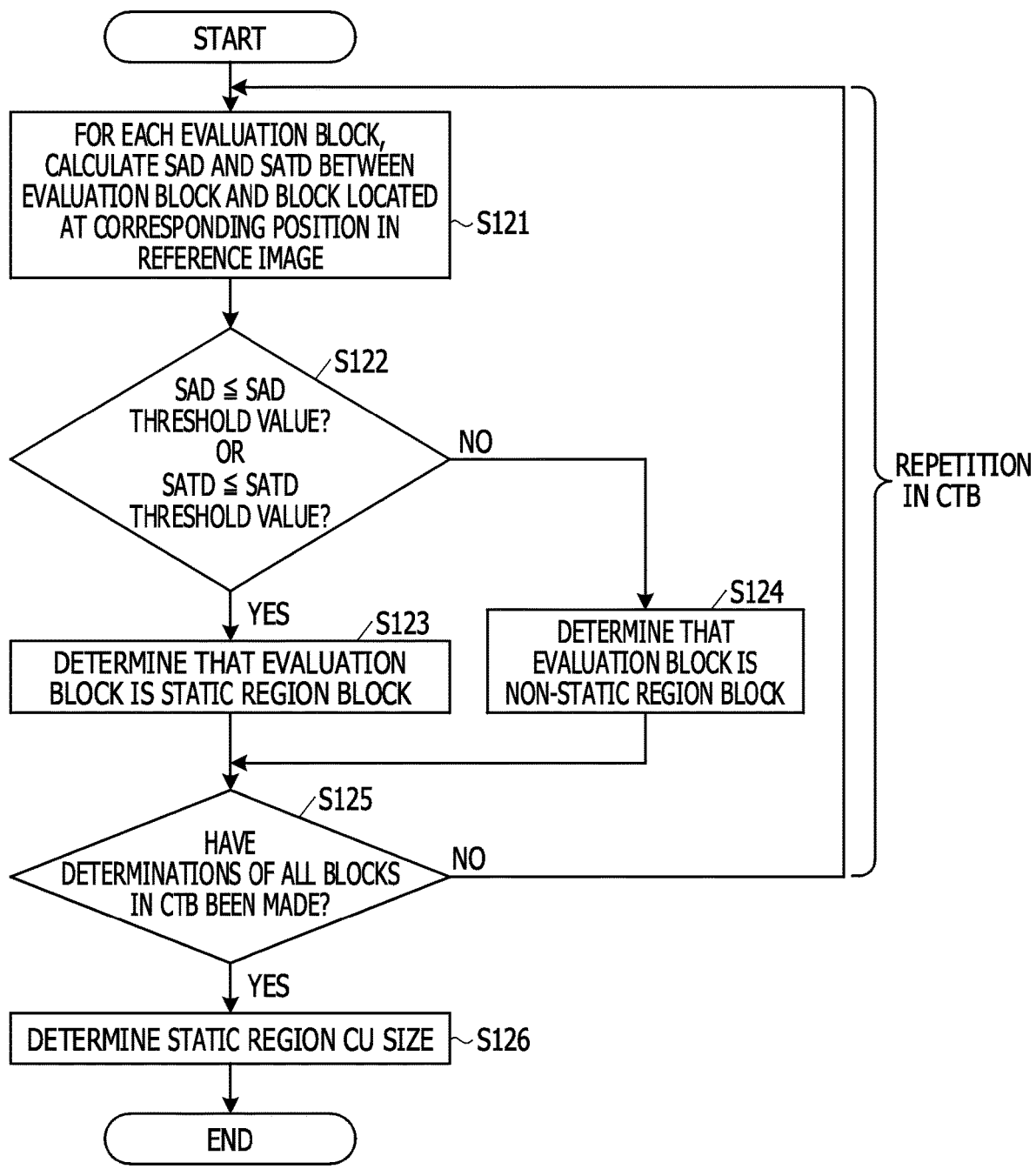
FIG. 9 is a flowchart illustrating a procedure of a static region determination according to this embodiment.

FIG. 9 is a flowchart illustrating a procedure of a static region determination according to this embodiment. For each evaluation block in the input original image, the acquisition section 22b calculates a SAD and an SATD between the evaluation block in the input original image and an evaluation block located at a corresponding position in the reference image (step S121).

At this time, when a SAD or SATD is less than or equal to a threshold value (Yes in step S122), the stillness determination section 22c determines that the evaluation block is a static region block (step S123). When a SAD and an SATD are greater than respective threshold values (No in step S122), the stillness determination section 22c determines that the evaluation block is a non-static region block (step S124).

Then, when determinations of all blocks in the CTB have not been completed (No in step S125), the stillness determination section 22c returns to step S121 to perform the process repeatedly. When determinations of all blocks in the CTB have been completed (Yes in step S125), the stillness determination section 22c determines whether a CU of a size larger than the evaluation block size is considered as a static region (step S126). Then, the stillness determination section 22c determines that the CU of a size larger than the evaluation block size considered as a static region is a static region, and the process ends.

(3) Uniform Moving Region Determination Process

Figure 10:
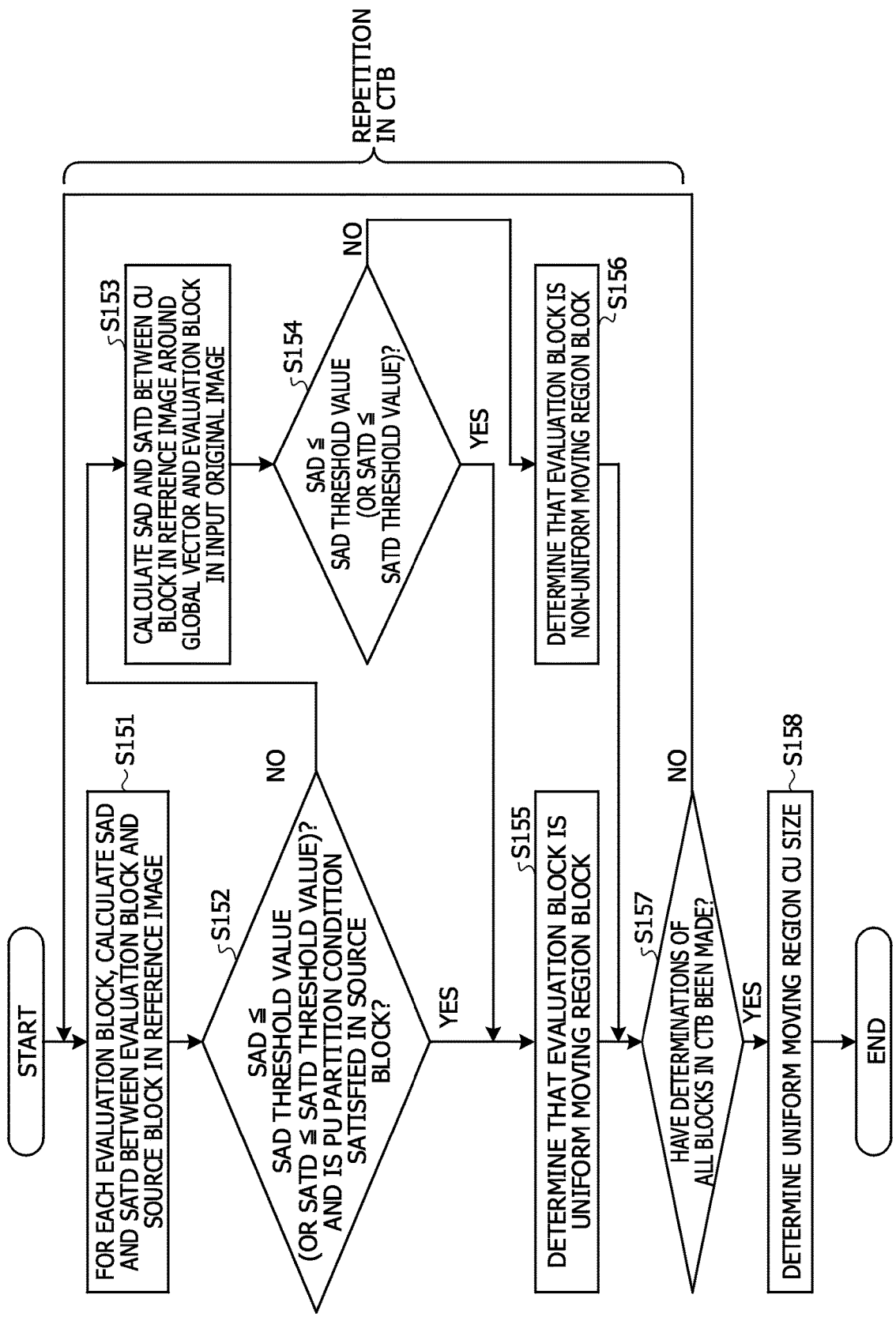
FIG. 10 is a flowchart illustrating a procedure of a uniform moving region determination according to this embodiment.

FIG. 10 is a flowchart illustrating a procedure of a uniform moving region determination according to this embodiment. For each evaluation block in the input original image, the acquisition section 22b calculates a SAD and an SATD between the evaluation block in the input original image and an evaluation block located at a position that is a source in the reference image identified based on a global vector (step S151).

At this time, when a SAD or SATD is less than or equal to a threshold value and a PU partition condition is satisfied (Yes in step S152), the uniform motion determination section 22d determines that the evaluation block is a uniform moving region block (step S155).

There is a case where a SAD and an SATD are greater than respective threshold values and where the PU partition condition is not satisfied (No in step S152). In this case, the acquisition section 22b calculates a SAD and an SATD between a CU block around the global vector and the evaluation block in the input original image (step S153).

At this time, when a SAD or SATD is less than or equal to the threshold value (Yes in step S154), the uniform motion determination section 22d determines that the evaluation block is a uniform moving region block (step S155). When a SAD and an SATD are greater than the respective threshold values (No in step S154), the uniform motion determination section 22d determines that the evaluation block is a non-uniform moving region block (step S156).

Then, when determinations of all blocks in the CTB have not been completed (No in step S157), the uniform motion determination section 22d returns to step S151 to perform the process repeatedly. When determinations of all blocks in the CTB have been completed (Yes in step S157), the uniform motion determination section 22d determines whether a CU of a size larger than the evaluation block size is considered as a uniform moving region (step S158). Then, the uniform motion determination section 22d determines that the CU of a size larger than the evaluation block size considered as a uniform moving region is a uniform moving region, and the process ends.

[One Aspect of Effects]

As described above, the encoding processing apparatus 10 according to this embodiment determines whether there is a correlation greater than or equal to a certain value between an image region in a reference image and an image region in an input original image in terms of image feature information. With respect to, among a plurality of image regions contained in the reference image and a plurality of image regions contained in the input original image, image regions whose respective positions in image data correspond each other, the encoding processing apparatus 10 makes the above-described determinations based on comparison results of acquired image feature information. The encoding processing apparatus 10 applies an encoding processing unit applied to an image region in the reference image having a correlation greater than or equal to the certain value in terms of image feature information.

This enables a reduction in the amount of recursive operations for calculating an optimal encoding processing unit in HEVC. Furthermore, with such a reduction in the amount of operations, the size of the circuit for encoding processing and power consumption are reduced.

The encoding processing apparatus 10 determines, based on, for example, a comparison result of an evaluation block in the input original image with an evaluation block in the reference image, that the evaluation block in the input original image having a correlation greater than or equal to a certain value with the evaluation block in the reference image in terms of image feature information is a static region. Then, the encoding processing apparatus 10 applies a CU, a PU, and a TU of the reference image to the static region.

This does not involve an operation for calculating an encoding processing unit in a static region.

The encoding processing apparatus 10 acquires a global vector between the reference image and the input original image and identifies, based on the global vector, a source evaluation block that is a source of an evaluation block having been determined to not be a static region in the input original image. Then, the encoding processing apparatus 10 determines, based on a comparison result of the evaluation block in the input original image with the source evaluation block, that the evaluation block in the input original image having a correlation greater than or equal to a certain value with the source evaluation block in terms of image feature information is a uniform moving region. The encoding processing apparatus 10 applies to the uniform moving region a PU among encoding processing units applied to the evaluation block in the reference image having a correlation greater than or equal to the certain value in terms of the image feature information.

This does not involve an operation for calculating a PU among operations for calculating encoding processing units in a uniform moving region.

Furthermore, encoding may be performed by applying a fixed value preset as an encoding processing unit to an evaluation block having been determined to be neither a static region nor a uniform moving region in the input original image. This enables a reduction in the amount of operations for calculating an encoding processing unit in a region other than a static region and a uniform moving region as well.

This enables a reduction in the amount of recursive operations for calculating a CU, a PU, and a TU in HEVC. Furthermore, with such a reduction in the amount of operations, the size of the circuit for encoding processing and power consumption are reduced.

For example, in a CTB of 64×64 pixels, in the case where there are four types of CUs and eight types of PUs, four types of CUs×eight types of PUs makes 32 combinations, and thus operations for 32 combinations have to be performed. On the other hand, in the case of a static region, a CU, a PU, and a TU of a reference image are applied, an operation for only one combination is performed, and thus the amount of operations is 1/32 of that in the CTB. If 1/3 of an input original image is a static region, from expression (3), it is seen that the effect of a 32.3% reduction in the amount of operations is obtained.

$$(1/3) \times (1-1/32) \times 100 = 32.3 \quad (3)$$

[Distribution and Integration]

Components of each device or apparatus illustrated in FIGS. 1, 3, and 4 do not have to be physically configured as illustrated in FIGS. 1, 3, and 4. That is, specific forms in which components of each device or apparatus are distributed or integrated are not limited to those illustrated in FIGS. 1, 3, and 4. All or some of the components may be functionally or physically distributed or integrated in any unit in accordance with various loads, usage states, or the like. For example, the encoding section 21 or the prediction section 22 may be connected as an external device of the encoding processing apparatus 10 via a network. Furthermore, the encoding section 21 and the prediction section 22 may be included in respective different devices and be connected via a network to work cooperatively with each other, thereby implementing functions of the encoding processing apparatus 10.

[Encoding Processing Program]

The various processes described in the above-described embodiment may be implemented by causing a computer, such as a personal computer or a workstation, to run a program prepared in advance. An example of a computer that runs an encoding processing program having the same functions as those in the above-described embodiment will be described below with reference to FIG. 11.

Figure 11:
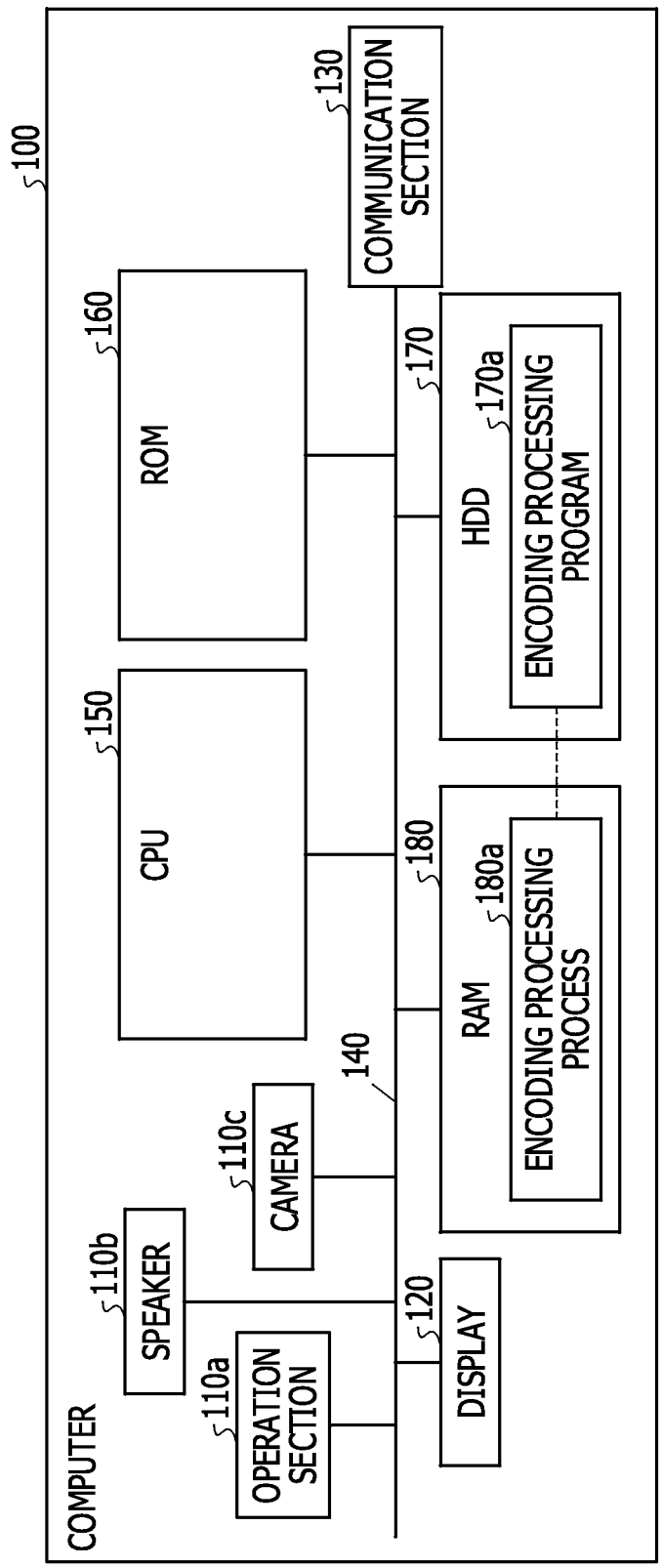
FIG. 11 illustrates an example of a hardware configuration of a computer that runs an encoding processing program according to an embodiment.

FIG. 11 illustrates an example of a hardware configuration of a computer that runs an encoding processing program according to an embodiment. As illustrated in FIG. 11, a computer 100 includes an operation section 110a, a speaker 110b, a camera 110c, a display 120, and a communication section 130. The computer 100 further includes a CPU 150, a read only memory (ROM) 160, an HDD 170, and a RAM 180. The sections denoted by 110a to 110c and 120 to 180 are connected via a bus 140.

As illustrated in FIG. 11, an encoding processing program 170a that exhibits the same functions as those of the encoding section 21 and the prediction section 22 described in the above-described embodiment is stored in the HDD 170. Components of the encoding processing program 170a may be integrated or separated as in the components of the encoding section 21 and the prediction section 22 illustrated in FIGS. 3 and 4. That is, not all the data described in the above-described embodiment has to be stored in the HDD 170, and data used in a process has only to be stored in the HDD 170.

Under such an environment, the CPU 150 reads the encoding processing program 170a from the HDD 170 and loads it into the RAM 180. As a result, as illustrated in FIG. 11, the encoding processing program 170a functions as an encoding processing process 180a. The encoding processing process 180a loads various types of data read from the HDD 170 into an area allocated to the encoding processing process 180a among storage areas included in the RAM 180 and executes various processes by using the loaded various types of data. For example, examples of processes performed by the encoding processing process 180a include the processes illustrated in FIGS. 8 to 10. In the CPU 150, all the processing sections described in the above-described embodiment do not have to operate, and a processing section corresponding to a process to be executed has only to be implemented virtually.

The above-described encoding processing program 170a does not have to be stored in the HDD 170 or the ROM 160 from the beginning. For example, each program is stored in a "portable physical medium", which is inserted into the computer 100, such as a flexible disk that is called an FD, a compact disc read only memory (CD-ROM), a digital versatile disk (DVD), a magnetic optical disk, or an integrated circuit (IC) card. Then, the computer 100 may acquire each program from the portable physical medium and run the program. Furthermore, each program may be stored in another computer, a server device, or the like connected to the computer 100 via a public network, the Internet, a local area network (LAN), a wide area network (WAN), or the like, and the computer 100 may acquire each program from the computer, the server device, or the like and run the program.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable storage medium storing an encoding processing program that causes a computer to execute a process, the process comprising:

acquiring reference image feature information of each of a plurality of reference image regions obtained by partitioning reference image data into at least two different sizes of coding units, including a large coding unit size that is larger than a small coding unit size, and input image feature information of each of a plurality of input image regions obtained by partitioning input image data into the small coding unit size;

determining whether the reference image feature information of a reference image region of the large coding unit size included in the reference image data has a correlation, satisfying a certain condition, with the input image feature information of an input image region of the large coding unit size included in the input image data, the certain condition being based on a number of small input image regions of the small coding unit size, within the input image region of the large coding unit size, wherein a difference between each of the small input image regions and a reference image region corresponding thereto is less than a threshold in terms of the input and reference image feature information; and coding, when the correlation is determined, the input image region by using a division pattern having been used in coding of the reference image region of the large coding unit size.

2. The non-transitory computer-readable storage medium according to claim 1, wherein the process comprises:

determining that the input image region in the input image data is a static region, and coding the static region by using a coding unit applied to the reference image region in the reference image data having been determined to have a correlation satisfying the certain condition in terms of the image feature information.

3. The non-transitory computer-readable storage medium according to claim 2, wherein the process further comprises:

acquiring a global vector between the reference image data and the input image data;

identifying, based on the global vector, a source image region that is a source of an image region of the input image data having been determined to not be the static region; and determining that the image region of the second image data having been determined to have a correlation satisfying the certain condition with the source image region in terms of the image feature information is a uniform moving region; and wherein, in the performing encoding, encoding is performed by applying to the uniform moving region a prediction unit included in encoding processing units applied to the reference image region of the reference image data having been determined to have a correlation satisfying the certain condition in terms of the image feature information.

4. An encoding processing method executed by a computer, the encoding processing method comprising:

acquiring reference image feature information of each of a plurality of reference image regions obtained by partitioning reference image data into at least two different sizes of coding units, including a large coding unit size that is larger than a small coding unit size, and input image feature information of each of a plurality of input image regions obtained by partitioning input image data into the small coding unit size;

determining whether the reference image feature information of a reference image region of the large coding unit size included in the reference image data has a correlation, satisfying a certain condition, with the input image feature information of an input image region of the large coding unit size included in the input image data, the certain condition being based on a number of small input image regions of the small coding unit size, within the input image region of the large coding unit size, wherein a difference between each of the small input image regions and a reference image region corresponding thereto is less than a threshold in terms of the input and reference image feature information; and coding, when the correlation is determined, the input image region by using a division pattern having been used in coding of the reference image region of the large coding unit size.

5. An encoding processing apparatus comprising:

a memory; and a processor coupled to the memory and the processor configured to:

acquire reference image feature information of each of a plurality of reference image regions obtained by partitioning reference image data into at least two different sizes of coding units, including a large coding unit size that is larger than a small coding unit size, and input image feature information of each of a plurality of input image regions obtained by partitioning input image data in the small coding unit size;

determine whether the reference image feature information of a reference image region of the large coding unit size included in the reference image data has a correlation, satisfying a certain condition, with the input image feature information of an input image region of the large coding unit size included in the input image data, the certain condition being based on a number of small input image regions of the small coding unit size, within the input image region of the large coding unit size, wherein a difference between each of the small input image regions and a reference image region corresponding thereto is less than a threshold in terms of the input and reference image feature information; and code, when the correlation is determined, the input image region by using a division pattern having been used in coding of the reference image region of the large coding unit size.

* * * * *